Dec. 19, 1922.

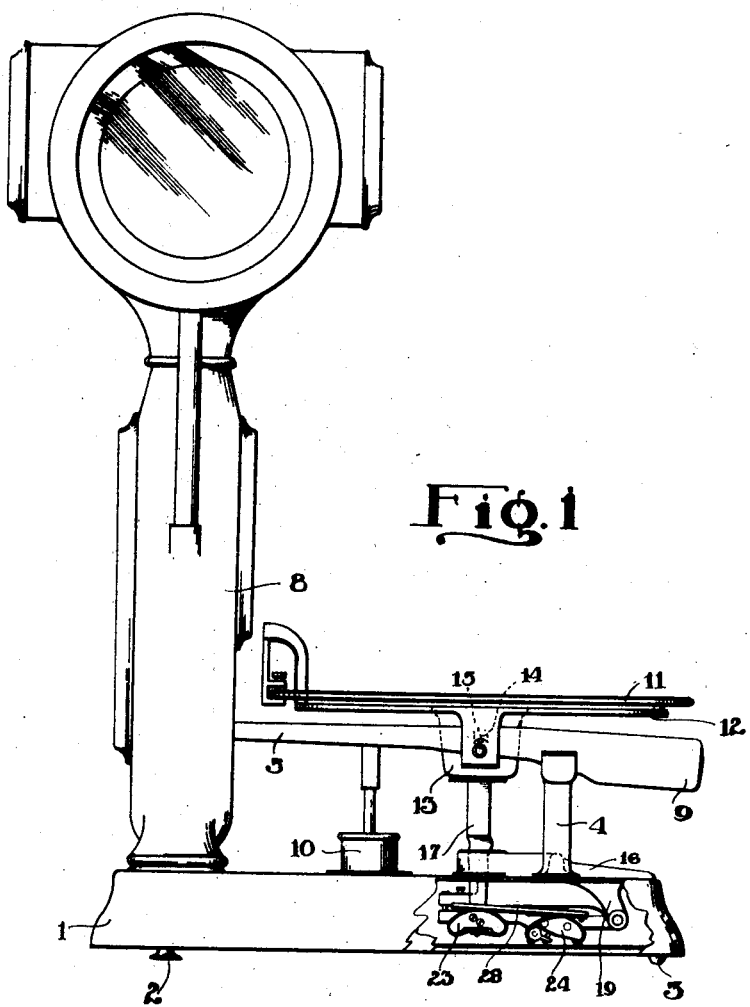

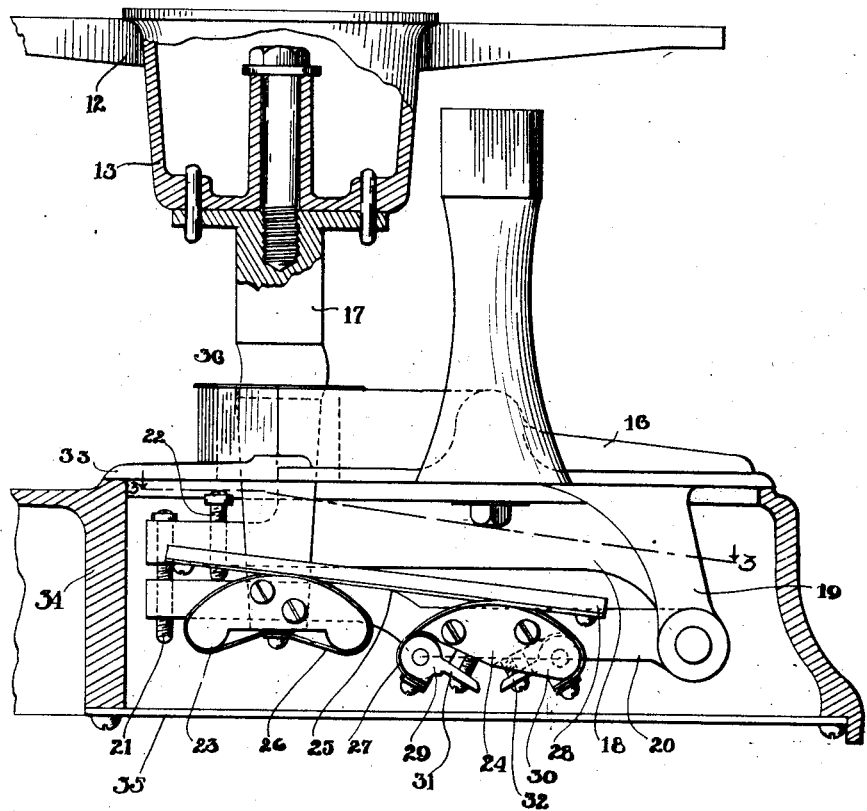
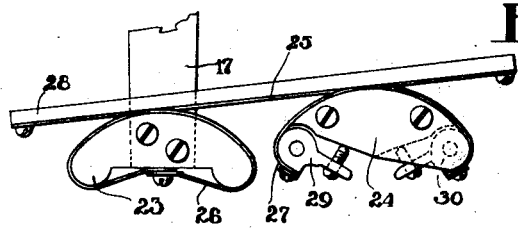

E. G. THOMAS.
CONNECTING DEVICE.
FILED FEB. 7, 1921.

1,439,203.

Witness
C. E. Wilcox.

Inventor
EDWARD G. THOMAS.

By C. C. Marshall
Attorney

Patented Dec. 19, 1922.

1,439,203

UNITED STATES PATENT OFFICE.

EDWARD G. THOMAS, OF TOLEDO, OHIO, ASSIGNOR TO TOLEDO SCALE COMPANY, OF TOLEDO, OHIO, A CORPORATION OF NEW JERSEY.

CONNECTING DEVICE.

Application filed February 7, 1921. Serial No. 443,025.

*To all whom it may concern:*

Be it known that I, EDWARD G. THOMAS, a citizen of the United States, residing at Toledo, in the county of Lucas and State of Ohio, have invented certain new and useful Improvements in Connecting Devices, of which the following is a specification.

This invention in its broader aspect relates to connecting devices, and one of its principal objects is the provision of a device for so connecting relatively movable parts that they are movable in controlled paths without appreciable friction.

Another object is to provide a link connection in the operation of which friction and wear are practically eliminated.

In a more specific aspect the invention relates to weighing scales, and particularly to scales of the type in which the platform is supported upon axially aligned pivots and is located above the lever by which it is carried. In scales of this type some means must be provided to prevent the platform from tipping, and this stabilizing means must be so arranged as to operate without interference with the weighing movement of the lever and without setting up forces having vertical components, regardless of whether or not the center of mass of the load is directly above the axis of the platform-supporting pivots.

It is an object of this invention to provide a device of this character which is not subject, by wear or otherwise, to such disarrangement as is likely to affect the accuracy of the scale.

Another object is to provide a device of this character in which the relation of the parts may be accurately adjusted.

Other objects and advantages will be apparent from the following description, in which reference is had to the accompanying drawings illustrating a preferred embodiment of my invention and wherein similar reference numerals designate similar parts throughout the several views.

In the drawings:—

Figure 1 is a side elevation of a weighing scale embodying my invention, parts being broken away to show the novel features;

Figure 2 is an enlarged fragmentary section showing the parts of my connecting device in greater detail;

Figure 4 is a fragmentary elevation showing the parts in the position assumed when the scale is under load.

Figure 3:
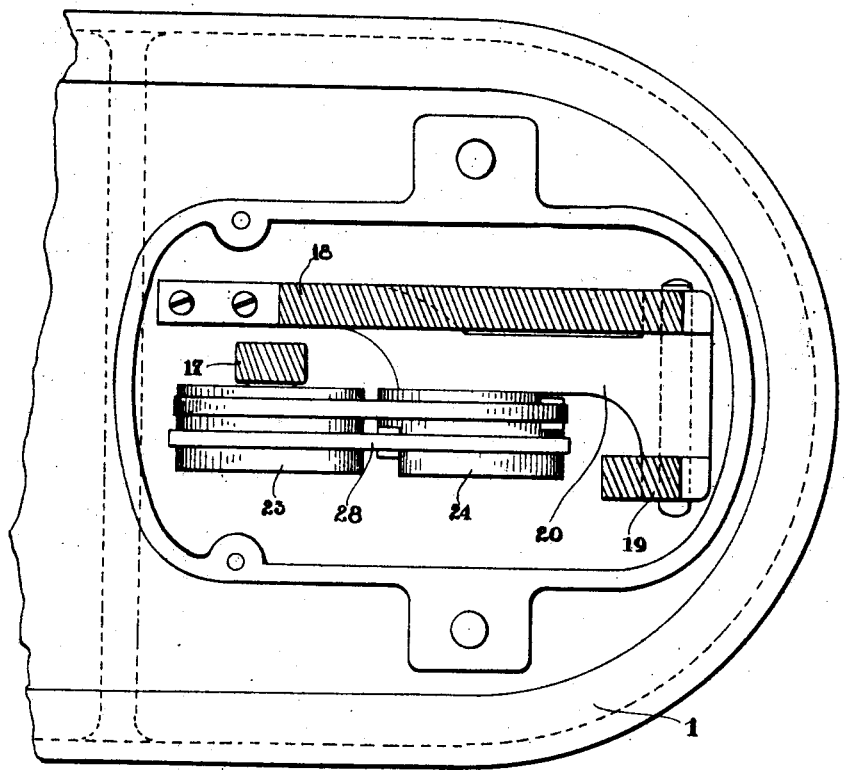
Figure 3 is a sectional plan taken substantially on the line 3—3 of Figure 2.

Although I have shown the device of my invention as embodied in an automatic weighing scale, it is to be understood that the connection employed is capable of use in other types of machines and that I contemplate its use wherever applicable.

In the drawings I have shown a weighing scale having a base 1 supported upon feet 2 and 3. Fulcrum stands 4 are supported upon the base adjacent its forward end, and the main lever 5 of the scale is provided with knife-edge pivots which rest in V-groove bearings secured in the upper ends of the fulcrum stands. The rear end of the lever 5 extends into an upright housing 8 at the rear end of the scale, within which it is connected with suitable load-offsetting and indicating mechanism (not shown). The lever 5 is enlarged at its forward end to form a counterweight 9, and is connected intermediate its ends to a dash pot damping device 10. The platform 11 is supported upon a platform spider 12 having the usual loading box 13 and provided with grooved bearings 14 which rest upon upturned knife-edge pivots 15 fixed to the lever 5. The structure so far described is not per se of my invention and therefore it has not been illustrated in exhaustive detail.

The portion of the upper side of the base which supports the base horn or fulcrum stands 4 is formed as a close fitting removable plate 16 having an opening which receives a spider stem 17. Secured upon the lower side of the plate 16 is a bracket 18 having a pair of downwardly-projecting members 19 to which is pivoted an arm 20, the rear end of the arm being offset, as shown in Figure 3, so as not to interfere with the free movement of the spider stem. A screw 21 passes through the bracket 18 and is threaded into the arm 20, while a second screw 22 is threaded through the bracket and engages the upper side of the arm. By means of these screws the arm may be raised or lowered and very accurately positioned.

Secured to the lower end of the spider stem 17 is a segmental member 23, while a similar segmental member 24 is secured to the arm 20. The segments 23 and 24 are connected by means of a flexible metallic band or ribbon 25 which overlies the curved faces of the segments and has its ends secured respectively to their upper sides. Additional metallic ribbons 26 and 27 are secured respectively to the lower sides of the segments 23 and 24 and extend in opposite directions over their curved faces, the ends of the ribbons 25 and 26 being fastened adjacent the ends of a bar 28. The width of the segments is sufficient to allow the ribbons 26 and 27 to be spaced laterally from the ribbon 25.

For the purpose of taking the slack out of the ribbons 25, 26 and 27, the ribbons 25 and 27 are attached to the segment 24 by means of adjusting drums 29 and 30 which have arms 31 and 32 rigid therewith, the said arms being connected to the segments by means of adjusting screws. By turning up the screw and the arm 31 the ribbon 27 is wound upon the drum 29, thus tightening the ribbon and forcing the bar 28 endwise, thereby also tightening the ribbon 26 which is secured to the other end of the bar and drawing the segment 23 rearwardly, thereby tightening the ribbon 25 which connects the two segments. Turning up the screw through the arm 31 thus tends to separate the segments 23 and 24, while turning up the screw through the arm 32 tends to draw them together. It is therefore obvious that by loosening one of the screws through the arm 31 or 32 and tightening the other, the segments may be adjusted toward or away from each other.

In assembling my device the segments should be so positioned that the distance from the center of curvature of the segment 23 to the knife edge of the load pivot 15 is equal to the distance from the center of curvature of the segment 24 to the knife edge of the fulcrum pivot 6 and the distance between the centers of curvature of the segments is equal to the distance between the edges of the fulcrum and load pivots. In other words, the centers of curvature of the segments and the pivot edges should lie at the corners of a parallelogram. The segment 24 which is carried by the arm 20 may be adjusted until a line joining the segment centers is parallel to a line joining the pivot edges by means of screws 21 and 22. A line tangent to the two segments will then be parallel to a line passing through the pivots 15 and 6, and the distance between the points of tangency will be equal to the distance between the pivots. It will be evident from inspection of Figure 2 that the segments and pivots will be maintained in this relation in all positions of the weighing mechanism, for as the segment 23 is depressed, a short length of the ribbon 25 is unwound from this segment and an equal length is wound upon the segment 24, while the ribbon 27 is partially unwound from the segment 24 and the ribbon 26 is wound to the same extent on the segment 23. The distance between the points of tangency therefore remains constant and the distance between the centers of the segments therefore also remains constant and equal to the distance between the pivots 6 and 15. Since the distance between the center of the segment 23 and the edge of the pivot 15, as well as the distance between the center of the segment 24 and the edge of the pivot 6, is fixed, the parallelogram is not destroyed by movement of the parts to any weighing position, and the effect of the device is the same as would be that of a link pivoted at the centers of the segments. When the device is properly adjusted, a load placed at the forward or rear edge of the platform will have the same effect upon the load-offsetting mechanism as a load placed in the center of the platform—that is to say, the scale will indicate the same weight for the same load, regardless of the position of the load on the platform.

In order to render the screws 21 and 22 accessible for adjustment, the plate 16 is divided into two parts, the part 33 at the rear of the spider stem being readily removable. A partition 34 extends across the base at the rear of the device, and the opening below the device is closed by means of a sheet metal plate 35. A dust washer 36 closely surrounds the portion of the spider stem which reciprocates through the plate 16, this part of the stem being preferably rectangular in cross-section. As the spider stem moves vertically during a weighing operation it also moves slightly fore and aft, and if the stem were straight the washer 36 would therefore be slid back and forth on the plate 16 as the stem moved up and down. I have avoided this difficulty by curving the front and rear sides of this portion of the stem oppositely to its direction of movement, so that the part of the stem level with the washer has the same location in all weighing positions, and no horizontal movement of the washer results from the swinging movement of the stem.

From the foregoing it is believed to be apparent that I have provided a frictionless connection capable of accurate adjustment and one in which the parts are not liable to appreciable wear.

While it will be apparent that the illustrated embodiment of my invention herein disclosed is well calculated to adequately fulfill the objects primarily stated, it is to be understood that the invention is susceptible to variation, modification and change within the spirit and scope of the subjoined claims.

Having described my invention, I claim:

1. In a connecting device, in combination, a pair of relatively movable members having curved surfaces, strut means lying substantially tangentially to said members and movable about the peripheries thereof, and means for maintaining the points of tangency of said strut means to said members substantially equidistant during relative movement of said members.

2. In a connecting device, in combination, a pair of segmental members, flexible means connecting said members, a strut, and flexible means connecting said members and said strut whereby said strut forms a push connection between said members.

3. In a connecting device, in combination, a pair of members having curved surfaces of identical radius, flexible means overlying said curved surfaces and connecting said members, a strut, and flexible means overlying said curved surfaces and connected to said strut.

4. In a connecting device, in combination, a pair of members having curved surfaces of identical radius, flexible means overlying said curved surfaces and connecting said members, a strut, flexible means overlying said curved surfaces and connected to said strut, and means for tightening or slackening said flexible means.

5. In a weighing scale, in combination, a base, a platform support, two circular segments of identical radii, one fixed to the base and the other to the platform support, and spacing means including a strut and flexible members connecting the said segments.

6. In a weighing scale, in combination, a frame, a weighing lever, a platform support pivoted thereon, check link mechanism comprising two segments of identical radii, one adjustably secured to the frame of the scale and the other fixed to the platform support, a flexible ribbon preventing the separation of said segments, and a strut preventing their approach.

7. In a weighing scale, in combination, a frame, a weighing lever, a platform support pivoted thereon, check link mechanism comprising two segments of identical radii, one adjustably secured to the frame of the scale and the other fixed to the platform support, a flexible ribbon preventing the separation of said segments, a strut preventing their approach, and means for adjusting the effective lengths of said ribbon and said strut.

8. In a weighing scale, in combination, a platform support, and check link mechanism comprising a stationary member having a curved surface, a member attached to said platform support and having a similar curved surface, and tangential spacing means including flexible members connected to said curved surfaces.

9. In a weighing scale, in combination, a base, a weighing lever, a platform support on said weighing lever, a curved member fixed to said platform support, a similar curved member adjustably mounted on said base, and tangential spacing means including flexible members attached to said curved members.

10. In a weighing scale, in combination, a base, a weighing lever, a platform support on said weighing lever, a curved member fixed to said platform support, an arm pivoted to said base, means for adjusting the position of said arm, a second curved member fixed to said arm, and tangential spacing means including flexible members attached to said curved members.

11. In a weighing scale, in combination, a base, a weighing lever, a platform support on said weighing lever, a curved member fixed to said platform support, a similar curved member fixed to said base, flexible means connecting said curved members, a tangential strut, flexible means connecting said curved members to said strut, and means for loosening and tightening said flexible means.

EDWARD G. THOMAS.

Witnesses:
H. O. Ernsberger,
Frances Doyle.